Dec. 5, 1967    J. J. TOWNSLEY    3,356,379
DISAPPEARING HERMETIC SEAL
Filed March 15, 1965

INVENTOR.
JOHN J. TOWNSLEY
BY
*William R. Wright*
AGENT

United States Patent Office

3,356,379
Patented Dec. 5, 1967

3,356,379
DISAPPEARING HERMETIC SEAL
John J. Townsley, Parsippany, N.J., assignor to Thiokol Chemical Corporation, Bristol, Pa., a corporation of Delaware
Filed Mar. 15, 1965, Ser. No. 439,825
6 Claims. (Cl. 277—237)

ABSTRACT OF THE DISCLOSURE

A hermetic seal connecting a liquid dispensing piston and its enclosing cylinder and isolating the piston and its dynamic seals from the liquid until movement of the piston to shear the hermetic seal.

---

This invention relates generally to seals and more particularly to a seal for hermetically isolating dynamic seals from stored corrosive chemicals or from fuels stored in prepackaged rocket powerplants.

When such fuels or chemicals are to be used, they are often dispensed from the storage receptacle or tank by means of a movable wall or a piston having a sliding fit therein and sealed against leakage by means of dynamic seals. The wall or piston is moved from the storage to full discharge position by means of gas pressure, etc. acting on the opposite face of the piston.

Such arrangement has the disadvantage of leakage problems due to manufacturing imperfections, and to long storage periods with deterioration of the dynamic seals exposed to the stored fluid, and it is therefore desirable to hermetically seal the fuels or chemical against contact with the dynamic seals. However, such hermetic seals must be frangible and have the disadvantage of sharp broken edges which can damage the dynamic seals during the dispensing or expelling of the fuels or chemicals from their storage tank.

Accordingly, the main object of the present invention is to provide a hermetic seal between a liquid storage tank and its liquid expelling wall or piston which will obviate the above and other disadvantages characterizing known structures.

An important object of the present invention is to provide a novel hermetic seal for liquid storage tanks and their liquid dispensing or expelling pistons, and means for bursting it and removing it from the path of the piston during its liquid expelling movement.

Another important object of the present invention is to provide a hermetic seal between a gas or liquid storage tank and its movable, fluid expelling, dynamically sealed, wall which is rupturable upon movement of the wall which is thereafter sealed dynamically to prevent leakage of the fluid behind the wall.

A further important object of the present invention is to provide a frangible hermetic seal between a fluid storage tank and its movable, fluid expelling, dynamically sealed wall which is rupturable by the wall upon movement thereof and removed from the path of the wall to prevent damage to its dynamic seals.

Other objects and advantages of the invention will become apparent during the course of the following description.

In the drawings I have shown one embodiment of the invention. In this showing:

Figure 1:
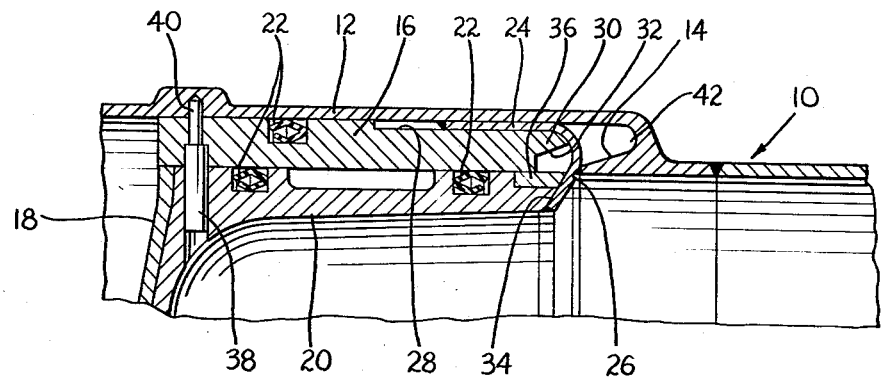
FIGURE 1 is a fragmentary, central, longitudinal sectional view of the invention in the storage position.

In its broadest aspects, the invention contemplates the hermetic isolation during storage by a frangible seal of the dynamic seals of a movable fluid expelling wall from the deteriorating influence or contact of the fluid stored in a tank from which it is to be ultimately discharged by wall movement.

Referring to the drawings, numeral 10 designates as a whole a circular or annular tank for the storage of fluids which are ultimately to be discharged therefrom by a discharge conduit communicating with an end wall (not shown), the conduit being normally closed by a valve, burst disc, etc. (not shown).

The cylindrical tank 10 includes an enlarged diameter portion 12 terminating at its right end in an inclined shoulder 14 for a purpose to be explained, and receives an annular slide 16 whose inner diameter is equal to that of the tank 10. The left end of the tank is closed by or includes in addition to such a closure, an inner circular or annular wall 18 which may take any of several forms and which is illustrated as the head of a piston 20 which is slidably mounted in the slide 16 and hence in the tank 10.

The piston and the slide are dynamically sealed with respect to each other and to the enlarged tank portion 12 by O-rings, etc. or as shown, by C-rings 22 which are held under compression in their recesses. These dynamic seals adequately prevent leakage of the stored fluid during its discharge from the tank 10 but are subject to deterioration from corrosion, etc. by the fluid during long periods of storage.

To isolate the dynamic seals 22 from the stored fluid, a frangible seal 24 which may be of metal and notched as at 26, is welded or otherwise hermetically sealed at one end to the inner wall of the enlarged tank portion 12 in an area provided by a recess 28 formed in the slide 16. The seal 24 is passed about the curved right end 30 of the slide which includes an inner inclined portion 32, and its other end is hermetically sealed by welding to the inclined right end 34 of the piston 20. It is to be noted that a sharp blade 36 which may be serrated if desired, is mounted in a recess on the outer face of the piston end 34 in substantial contact with the hermetic seal 24 so that upon movement of the piston 20 to the right, the seal will be sheared through.

Movement of the piston 20 and the slide 16 during storage is prevented by means of a shear pin 38 which extends from the piston 20 into the slide 16 and includes a smaller diameter portion 40 extending into a shoulder, etc. of the tank portion 12.

*Operation*

Figure 2:
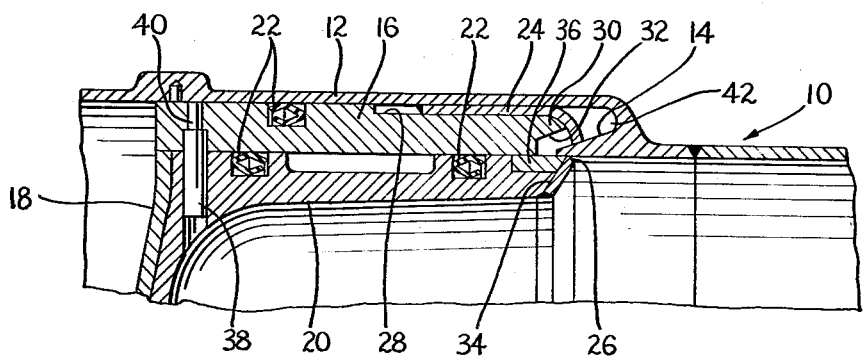
FIGURE 2 is a similar view showing the invention at the commencement of the fluid expelling movement of the wall which severs the hermetic seal.
Figure 3:
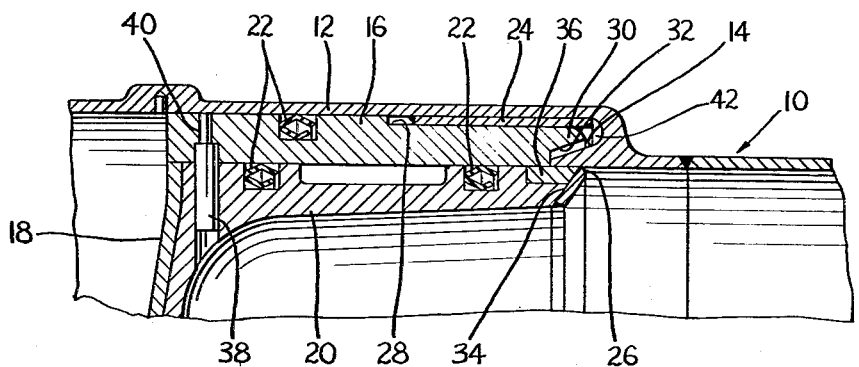
FIGURE 3 is a similar view showing the movement of the severed hermetic seal edges out of the path of the wall.

When the fluid in the tank 10 is to be discharged therefrom, gas pressure or other pressurizing medium from any suitable source (not shown) is directed from the left against the piston head 18 and at a predetermined pressure, the smaller diameter portion 40 of the shear pin 38 is sheared to permit the piston 20 and the slide 16 which are still coupled by the pin 38, to move together to the right to the position shown in FIGURE 2.

Such movement effects a shearing of the hermetic seal 24 by the knife 36 and a pushing of the upper portion and edges of the sheared seal to the right toward the inclined shoulder 14 by the right end 30 of the slide 16 to lift the ragged edges of the sheared hermetic seal radially away from the inner diameter of the slide and the tank 10 and confine it in the area 42 adjacent the inclined shoulder 14. Thus, the torn or sheared edges cannot engage and so injure the dynamic seals 22 in the piston 20 as it moves to the right.

When the lower portion of the right end 30 of the slide 16 hits the inclined shoulder 14 to close off the area 42, the gas pressure on the piston head 18 effects a shearing of the pin 38 so that the piston may move freely to the right to expel the fluid contained in the tank 10 from its discharge conduit (not shown).

It will now be readily apparent that the invention effects the hermetic isolation of the fluid in the tank 10 from the dynamic seals 22 during long storage periods thus making the invention especially suited for use with prepackaged, liquid propellant rocket powerplants in which the deterioration of the dynamic seals has long been a problem. Moreover, upon shearing of the hermetic seal at the time of utilization of the stored fluid—whether liquid fuels or corrosive liquids or gases—the severed hermetic seal portions are positively removed so that the dynamic seals do not have to pass over any damaging sharp or torn hermetic seal edges.

It is to be understood that the form of the invention herewith shown and described is to be taken as a preferred example of the same and that various changes in the shape, size and arrangement of parts may be resorted to without departure from the spirit of the invention or the scope of the subjoined claims.

I claim:

1. The combination with a fluid storage tank from which fluid is to be expelled and a wall including dynamic seals mounted for sliding movement on the inner surface of said tank to expel the fluid; of a frangible hermetic seal sealed to the tank and to the movable wall to isolate the fluid from the dynamic seals to prevent their deterioration during storage, the fluid expelling movement of the wall effecting a shearing of said hermetic seal.

2. The combination recited in claim 1, and means movable with said wall to remove the sheared edge portions of said hermetic seal from the path of said wall and its dynamic seals.

3. In combination, a fluid storage tank from which fluid is to be expelled, a wall slidably mounted in the inner walls of said tank and movable to expel fluid from said tank, dynamic seals between said tank walls and said wall, and a frangible hermetic seal fixed to said inner walls and to said movable wall to isolate the tank fluid from said dynamic seals during storage; the fluid expelling movement of the wall effecting a shearing of said hermetic seal.

4. The combination recited in claim 3, and means movable with said wall to remove the sheared edge portions of said hermetic seal from the path of said wall and its dynamic seals.

5. In combination, a tank for the storage of fluids to be ultimately expelled therefrom, said tank having a portion of enlarged diameter, a slide mounted in said portion and having an internal diameter substantially equal to that of the tank, a piston mounted for sliding movement in said slide and in said tank and movable to expel fluid therefrom, dynamic seals mounted between said piston and said slide and said enlarged tank portion, and frangible means fixed to said enlarged portion and said piston to hermetically isolate the stored fluid from said dynamic seals to prevent their deterioration during storage, the fluid expelling movement of said piston effecting a shearing of said frangible means.

6. The combination recited in claim 5 wherein said slide is movable with said piston to remove the sheared edge portions of said fixed means from the path of said piston and said dynamic seals.

References Cited

UNITED STATES PATENTS

| | | | |
|---|---|---|---|
| 1,235,550 | 8/1917 | Carmody | 222—390 |
| 2,753,801 | 7/1956 | Cumming | 158—501 |
| 2,954,670 | 10/1960 | Helus et al. | 60—259 |
| 3,000,542 | 9/1961 | Longenecker et al. | 222—389 |
| 3,106,060 | 10/1963 | Comer | 60—259 |
| 3,138,929 | 6/1964 | Schatz | 222—389 |

LAVERNE D. GEIGER, *Primary Examiner.*

D. MASSENBERG, *Assistant Examiner.*